United States Patent [19]

Ives et al.

[11] Patent Number: 4,806,881
[45] Date of Patent: Feb. 21, 1989

[54] MULTI-CHANNEL MODULATED NUMERICAL FREQUENCY SYNTHESIZER

[75] Inventors: Fred H. Ives, Veradale, Wash.; Robert T. Dickerson; William J. Dickerson, both of Paso Robles, Calif.; Michael D. McNamee, Spokane; Mark D. Talbot, Liberty Way, both of Wash.

[73] Assignee: Hewlett-Packard Company, Palo Alto, Calif.

[21] Appl. No.: 90,318

[22] Filed: Aug. 28, 1987

[51] Int. Cl.⁴ .......................................... H03B 19/00
[52] U.S. Cl. ........................................ 332/22; 328/14; 364/858; 455/102
[58] Field of Search ............... 332/9 R, 16 R, 17, 22, 332/31 R; 331/46, 47, 49; 307/260; 328/14; 455/102; 364/607, 608, 718, 851, 852, 858

[56] References Cited

U.S. PATENT DOCUMENTS 3,735,269  5/1973  Jackson ........................... 328/186 X
4,454,486  6/1984  Hassun et al. .................... 328/14 X Primary Examiner—Eugene R. Laroche
Assistant Examiner—Robert J. Pascal
Attorney, Agent, or Firm—Leslie G. Murray

[57] ABSTRACT

A four-channel multifunction digital frequency synthesizer which uses direct numerical synthesis to generate one or more complex output signals having selectable frequency, phase offset, amplitude level and waveform is provided. A waveform synthesizer digitally synthesizes precise sine, square, triangle, ramp, uniform and Gaussian noise and DC waveforms which can be selected for any of the four channels. One of the four channels can be frequency, phase and amplitude modulated by the signals on the remaining three channels in any combination. The four channels are time-multiplexed which allows the use of a single frequency synthesizer to realize four independent channels and a large number of support functions and capabilities in a high-density VLSI integrated circuit on a single chip. The synthesizer system can provide up to four independent output signals which can be any one of the four channel signals, or any combination of the four channel signals summed to form a complex waveform signal.

13 Claims, 7 Drawing Sheets

MULTI-CHANNEL MODULATED NUMERICAL FREQUENCY SYNTHESIZER

BACKGROUND OF THE INVENTION

The present invention relates generally to a multi-channel signal synthesizer system providing a wide variety of complex signal waveforms, and, more particularly, relates to a four channel numerical digital synthesizer system providing one or more output signals having selectable waveform and modulation characteristics.

Most signal synthesizer systems provide precision waveforms, signals with frequency accuracy and resolution for test evaluation of electrical systems. For example, a signal channel synthesizer system can be synthesizer, function generator and sweep generator providing sine waves, square, triangle and ramp waveforms for use. As a synthesizer, the single channel system provides waveforms having precise frequency control. As a function generator, the synthesizer system provides a variety of waveforms including sine, square, triangle and ramp. As a sweep generator, the synthesizer can sweep over a range of frequencies. However, there is a high demand for much improved performance of the prior art synthesizer systems in spectral purity, phase noise and phase accuracy. Further more, it is desirable to provide the prior art synthesizer system with a variety of additional capabilities and functions.

Various types of digital frequency synthesizers are known in the art. U.S. Pat. No. 3,735,269 entitled "Digital Frequency Synthesizer" granted to Leland B. Jackson on May 22, 1973, discloses a digital frequency synthesizer which is programmable to provide desired frequency outputs. Jackson discloses a digital synthesizer which includes storage means such as a read-only-memory (ROM) in which digital values corresponding to digital samples of the desired output signal from the synthesizer are stored. These digital samples represent a predetermined waveform, such as a sine wave. In response to a digital signal representing a predetermined frequency output the storage means provides output signals corresponding to the digital values stored therein. The successively generated digital values are fed to a digital-to-analog convertor (DAC) which generates a step-type representation of the desired output signal. The output signal is then smoothed in a low pass filter to provide an output signal having the predetermined frequency and waveform. The synthesizer system of Jackson does not provide multi-channel capabilities nor does it provide selective modulation and waveform generation capabilities.

The main object of the present invention is to provide a multifunction digital frequency synthesizer which is easily programmable to provide complex output waveform signals from a variety of selectable fundamental waveforms.

Another object of the present invention is to provide such a multifunction digital frequency synthesizer system having multiple internal channels to provide frequency, amplitude, phase and pulse modulation of a single channel with selectable waveform or be summed at the output to provide a single complex output waveform.

A further object of the present invention is to provide such a digital frequency synthesizer which utilizes a single VLSI integrated circuit (IC) to achieve the direct digital synthesis, waveform generation, summation, multiplication, modulation and multiplexing functions to achieve a high level integration which results in an output signal having well-defined accuracy and exact repeatability at a low cost.

SUMMARY OF THE INVENTION

In accordance with the principles of the present invention a multifunction digital frequency synthesizer includes an input device such as a keyboard with display and a communication bus interface for programming a predetermined output frequency and other characteristics of a desired output signal and for generating digital signals representing the programmed inputs. A waveform synthesis circuit utilizes digital techniques to calculate numerical representations of complex waveforms. The waveform synthesizer can generate a variety of selectable waveforms on four independent internal channels. Any combination of the generated waveforms on the internal channels can then be used to modulate one of the channels in amplitude, phase, frequency, or pulse modulation. Any combination of modulation type and waveform source may be used concurrently. For example, the sum of the waveforms on channels B and C may be utilized to amplitude modulate the waveform on channel A while simultaneously the waveform on channel D frequency modulates the waveform on channel A. Further any of the waveforms on the independent channels may be summed together to provide a complex waveform at the output.

The multiple waveform generation, multiple waveform summation and complex waveform modulation is achieved by the use of time multiplexing. This use of time multiplexing results in a chip design that requires much less active area on the integrated circuit chip. The waveform synthesizer provides four fundamental waveform signal types including sine, square, ramp, triangle waves and both uniform noise and Gaussian noise plus a DC reference. A phase accumulator generates a digital ramp signal from which the triangle and ramp waveforms are generated by a simple numerical conversion process. A storage means such as a ROM stores a plurality of digital values corresponding to the magnitude of a sine wave at a plurality of phase points. The digital ramp output of the phase accumulator correspond to these phase points. To generate a sine wave the storage means in response to the phase accumulator output signal provides digital output values representative of the desired sine wave output signal. A noise generator in combination with a noise ROM provides both uniform noise and Gaussian noise signals. The square wave is digitally synthesized by outputting a series of digital ones and switching the level at the desired times. The various output waveforms from the waveform synthesizer are coupled to a multiplexer where the desired output waveform for each of the four internal channels is multiplexed onto a single output line. The four time-multiplexed internal channels may then be combined in a summer in any serial combination to provide four time-multiplexed signals. The four signals are coupled to an input multiplexer for modulation of internal channel A and a selected one of the signals is also coupled to a DAC and a low pass filter to provide a smooth output signal having the desired frequency modulation and waveform.

Up to three output sections may be added to provide a system having up to four output signals for which frequency, amplitude, waveform and phase can be independently set for each of the output signals. Although the output signals in this option are independent, the relative phase between the outputs can be precisely controlled from 0 degrees to 359.9 degrees with a resolution of 0.1 degrees.

The utilization of time multiplexing allows substantial reduction of the hardware required for the waveform synthesizer, the summation circuitry and the multiplication circuitry. For example, in the case of the waveform synthesizer the active hardware required is reduced by a factor of approximately four while still providing four internal channels. This hardware reduction allows all of the above described capabilities to be provided in one IC chip. The single IC chip provides the desired feature set with lower cost, greater reliability and improved ease of application compared to the prior art synthesizers. In addition, direct digital synthesizers insure accuracy and exact repeatability. Compared with analog technology drift is eliminated, accuracy is improved and the number of required adjustments is greatly reduced.

DETAIL DESCRIPTION OF THE PREFERRED EMBODIMENT

Figure 1:
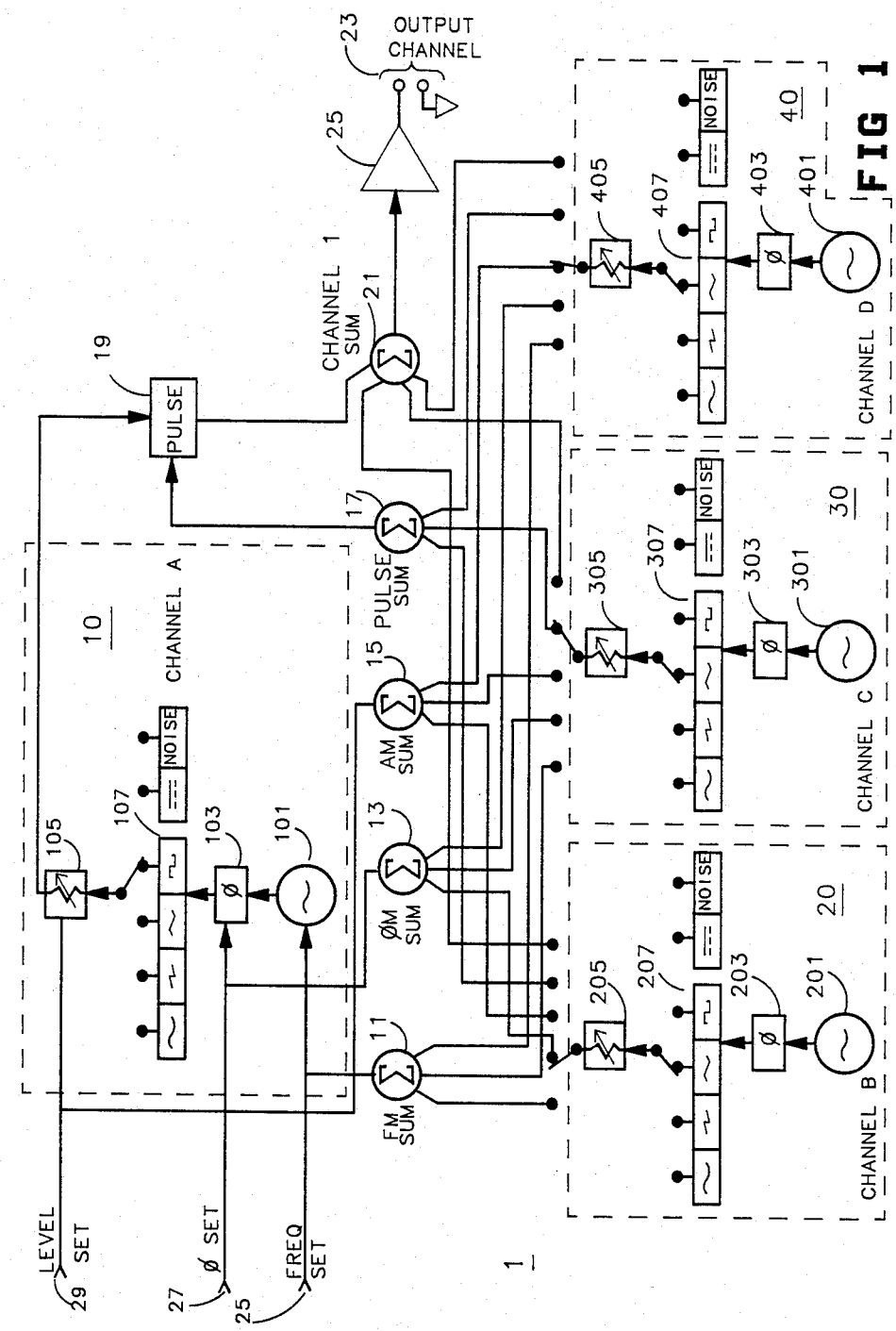
FIG. 1 is a block diagram illustrating a conceptual representation of a digital frequency synthesizer system according to the principles of the present invention.

Referring now to FIG 1, a conceptual block diagram of a multifunction digital frequency synthesizer according to the principles of the present invention is shown. The synthesizer comprises four essentially identical synthesizer channels 10, 20, 30 and 40, channel A, channel B, channel C and channel D, respectively, and provides a single output at the output channel 23. Channel A is the primary synthesizer channel 10 comprising an adjustable frequency generator 101 coupled to a phase offset and modulation block 103 which in turn is coupled to a waveform generator 107. Waveform generator 107 digitally synthesizes precise sine, square, triangle, ramp, uniform noise, Gaussian noise and DC waveforms. Any one of these fundamental waveforms may be selected and output to amplitude modulation block 105. The output of amplitude modulation block 105 is coupled to the channel summer block 21 via pulse modulation block 19. The desired output frequency for frequency generator 101 is set by an input signal on line 25. The initial phase angle and amplitude level for channel A may also be set by inputs on lines 27 and 29 respectfully.

Channels B, C and D comprise essentially identical synthesizer blocks 20, 30 and 40, respectfully. Each channel synthesizer 20, 30 and 40 comprises an adjustable frequency generator 201 coupled to phase offset adjustment 203 and then to waveform generation block 207. In a manner similar to waveform generation block 107 six fundamental waveforms are digitally synthesized and a selected one is output to amplitude level set block 205. The desired frequency, phase angle offset, waveform and amplitude level are set independently for each of the channel synthesizers 20, 30 and 40. The output of each channel synthesizer 20, 30 and 40 may be selectively coupled to one of several summing blocks 11, 13, 15, 17 and 21. FM summing block 11 may have any combination of the outputs of the channel synthesizers 20, 30 and 40 input to it and provides a FM signal to the channel A frequency generator 101. Similarly the phase modulation summing block 13, amplitude modulation summing block 15 and pulse summing block 17 may sum in any combination one or all of the outputs of the channel synthesizers 20, 30 and 40 to provide modulation signals to phase modulation block 103 amplitude modulation block 105 and pulse modulation block 19, respectively. In addition one or more of the channel synthesizers 20, 30 and 40 outputs may be coupled to the channel summer 21 to be summed with the output of the pulse modulation block 19 and with each other to provide the output on the output channel 23.

Figure 2:
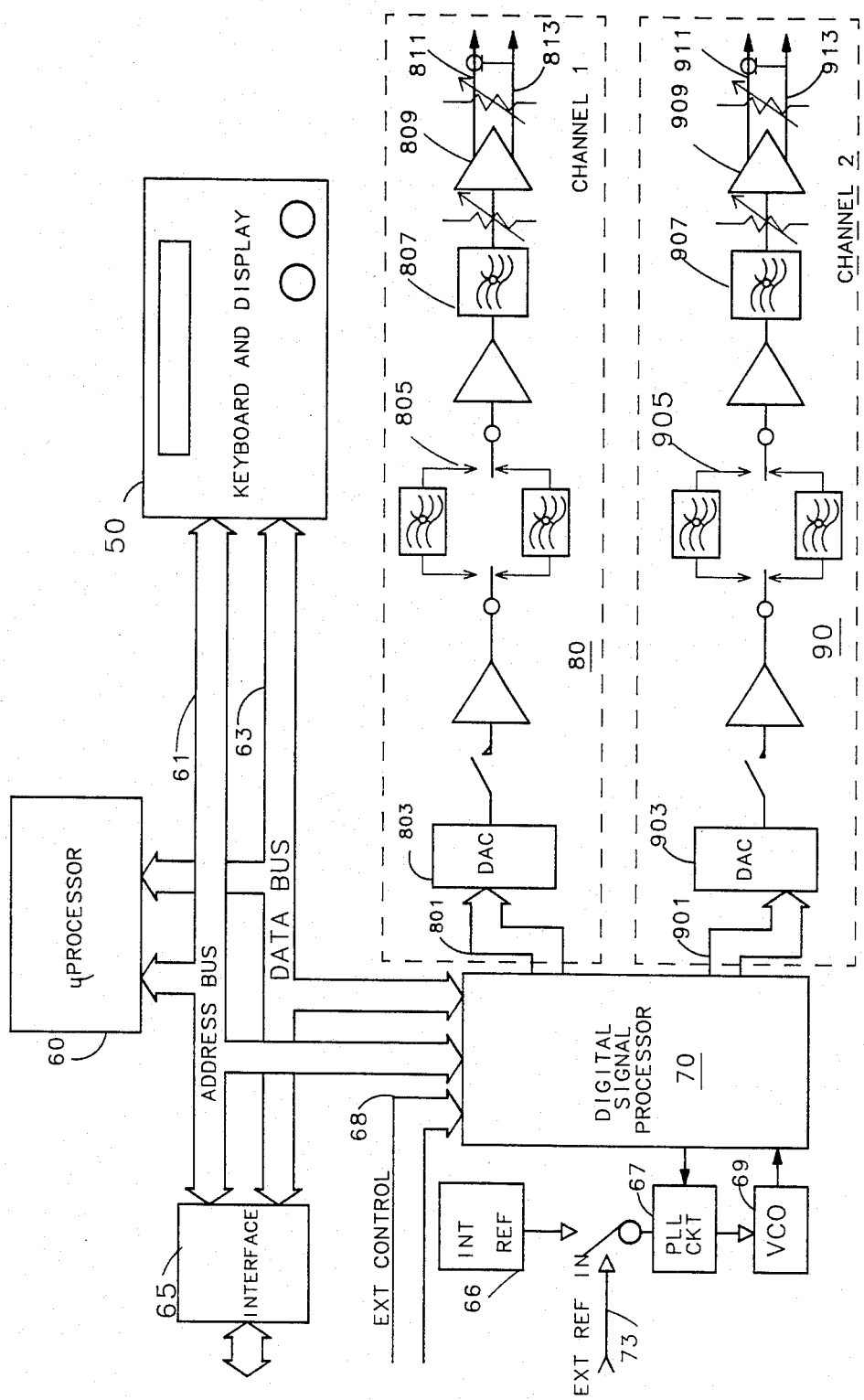
FIG. 2 is a basic schematic block diagram of a preferred embodiment according to the principles of the present invention.

Referring now also to FIG. 2, a schematic block diagram of the multifunction digital frequency synthesizer described hereinabove is shown. The digital frequency synthesizer system comprises a keyboard and display unit 50, a host microprocessor 60, a digital signal processor 70, communications bus interface 65 and output channel boards 80 and 90 providing output channels 1 and 2, respectfully. The keyboard and display unit 50 provides a keypad and a backlit liquid crystal display providing the capability to completely program all parameters of the output signals on channel 1 and channel 2. Programmable parameters include selectable waveforms, phase offsets, frequencies, fine level settings and modulation types. Softkeys (not shown) provide complete control of operating modes and sequence functions. The keyboard and display unit 50 also provides precise control of the relative phase difference between the independent outputs on channels 1 and 2. Microprocessor 60 provides overall control of the synthesizer system (a microprocessor designated MC6809 manufactured by Motorola may be used for this application). Microprocessor 60 also includes required random-access-memory (RAM) and ROM space for storing various sets of numerical data representing fundamental waveforms used by the synthesizer system. The communication bus interface 65 allows the digital frequency synthesizer system to be networked with other instruments to provide additional testing and analysis capabilities. The digital signal processor 70 comprises an integrated circuit providing direct numerical digital synthesis, summation, multiplication and multiplexing capabilities to provide for multiple independent synthesizer channels as shown in FIG. 1. In the preferred embodiment, a digital signal processor 70 comprises a single monolithic integrated circuit utilizing NMOS VLSI technology. The internal reference 66, phase lock loop 67 and the voltage-controlled oscillator 69 provide the digital processor 70 with the necessary reference and clock signals. External reference signals may be input on line 73 to provide the capability to phase lock the system to an outside source (not shown). External control signals on bus 68 provides the capability to directly program internal channel A to provide a predetermined sequence of output signals having independent phase, amplitude and frequency states. Output channel boards 80 and 90 provide two identical output channels, channel 1 and channel 2, respectfully. Output channel board 80 receives the output signal from digital signal processor 70 on signal bus 801. The output signal from the digital processor 70 is in the form of a 12-bit digital word representing the desired output signal for output channel 1 which is programmed at the keyboard and display unit 50. The DAC 803 converts the digital signal to an analog waveform. Analog filters 805 and 807 provides smoothing while differential amplifier 809 provides a differential output on output lines 811 and 813. In a similar manner output channel board 90 provides a differential analog output on lines 911 and 913.

Figure 3:
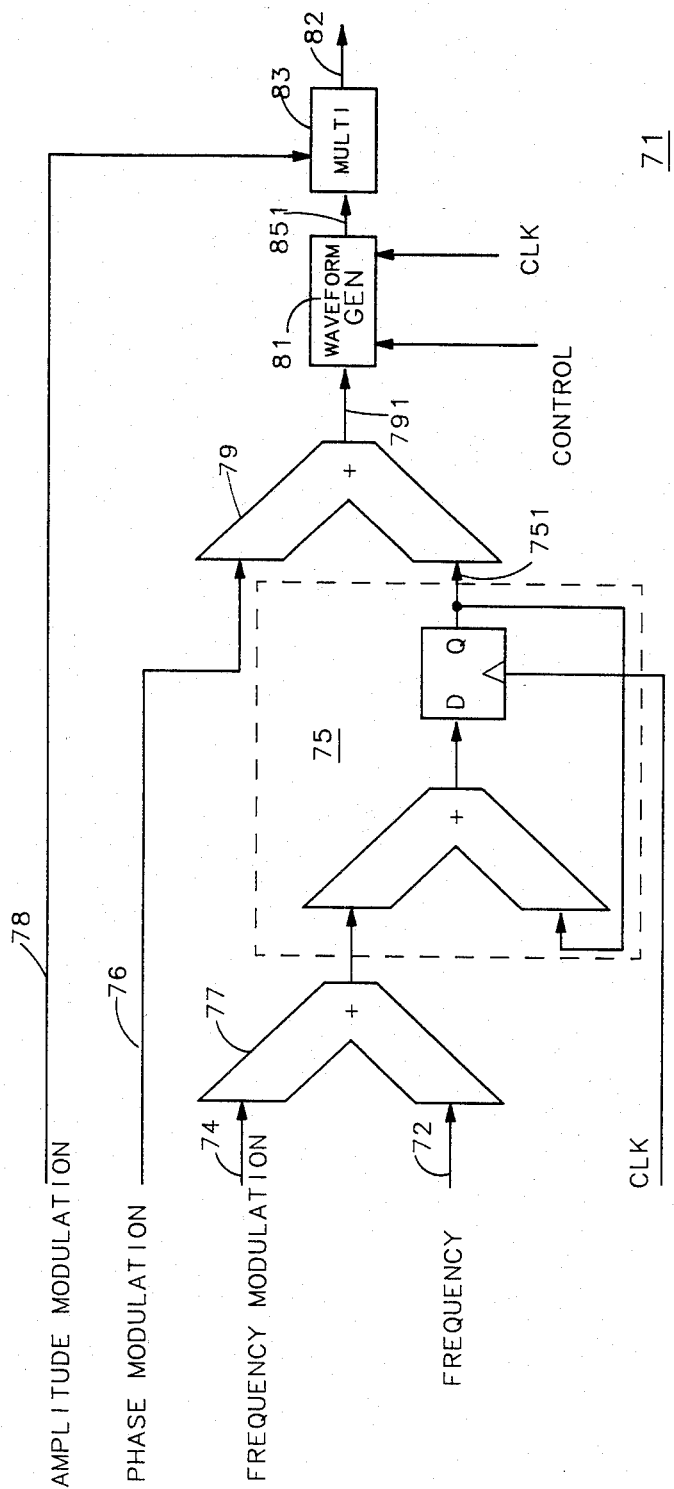
FIG. 3 is a simplified block diagram of the digital signal processor of FIG. 2.

Referring now to FIG. 3, a simplified block diagram of the basic signal generation circuitry is shown. The key component of the signal generation circuitry is the phase accumulator 75 which provides a cyclic progression of binary numbers on its output line 751. The sequence of binary numbers output on line 751 is passed through a waveform generating circuit 81 to provide various selectable periodic waveforms. Adders 77 and 79 provide frequency and phase modulation of the output of the accumulator 75. The base frequency of the output signal is set on line 72 at the input adder 77. A frequency modulation signal on line 74 provides frequency modulation of the output signal by varying the slope of the ramp at the output 751 of the accumulator 75. An input signal on line 76 may be utilized to provide an initial phase offset and/or continuous phase modulation of the output signal from the accumulator 75. A multiplier 83 receives control signals on line 78 to adjust the overall amplitude of the waveform and also to provide amplitude modulation of the output waveform. Multiplier 83 also provides pulse modulation of internal channel A. As implemented, pulse modulation is a special case of amplitude modulation.

Figure 4:
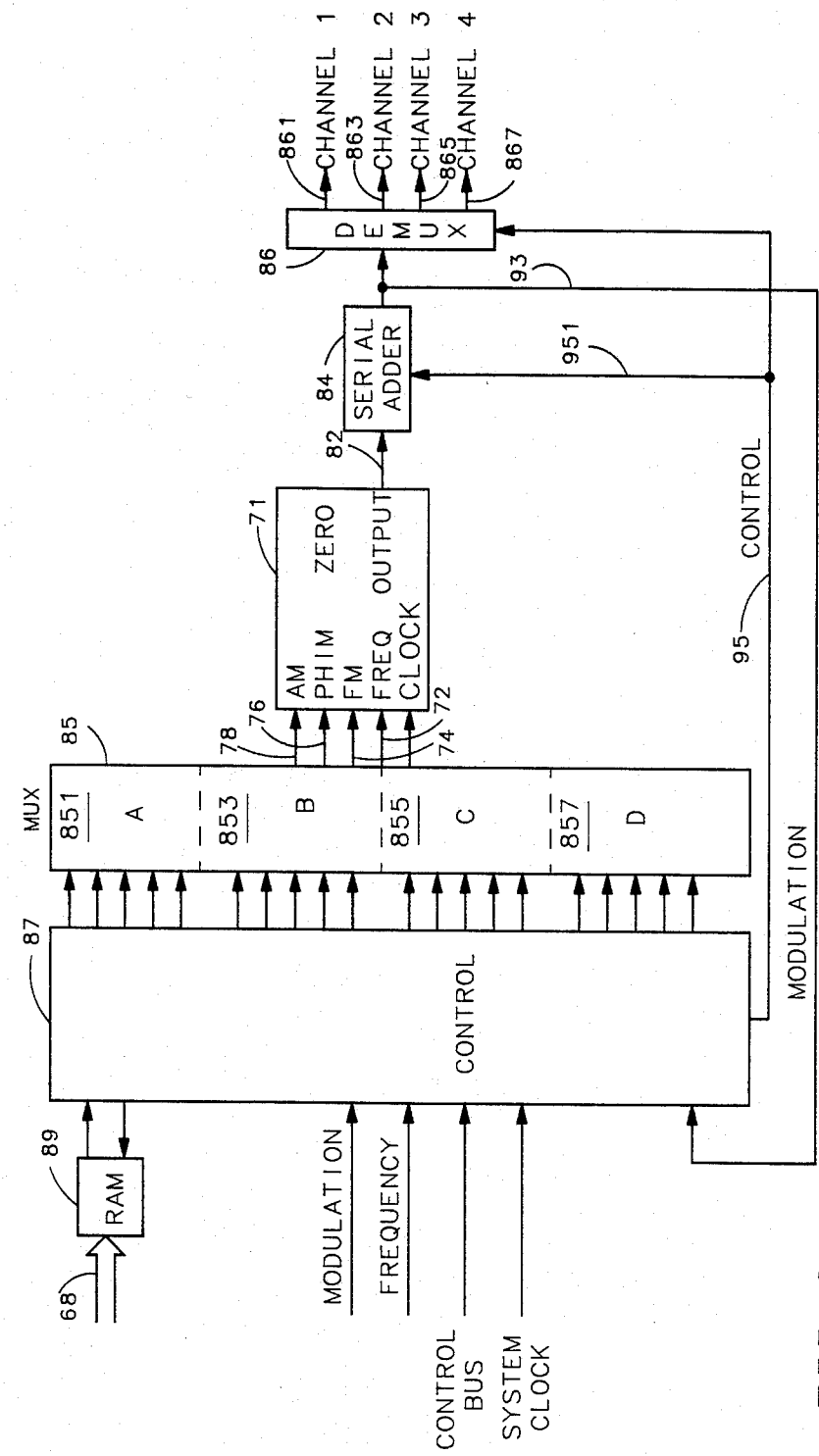
FIG. 4 is a simplified block diagram of a four channel implementation of the digital signal processor of FIG. 3.

Referring now to FIG. 4, a simplified block diagram of the four-channel implementation of the basic circuit 71 of FIG. 3 is shown. Multiplexer 85 is divided into four input multiplexers 851, 853, 855 and 857 to provide four independent internal synthesizer channels. Four-channel operation is achieved when control logic circuitry 87 selects a different multiplexer input on successive clock cycles thereby representing a different operating point for each signal parameter to the basic circuit 71. The result at the output 751 of the accumulator 75 is a progression of four internal separate binary number patterns multiplexed in time, each representing a separate internal channel. The parameters of amplitude level, phase offset, frequency and waveform type may be set for each of the independent channels. Thus at the output 82 of the multiplier 83, four independent time-multiplexed signals corresponding to internal channels A, B, C and D are output, each signal having predetermined frequency, phase, waveform and amplitude level. In addition, channel A may be modulated by any combination of channels B, C and D. Serial adder 84 comprises an accumulator that either passes the signals through unmodified or that sums any serial combination of the four internal channels. The serial adder 84 is coupled to demulitplexer 86 where a selected internal channel is demulplexed onto the output line 861 for output channel 1. Up to four demultiplexers 86 may be utilized in parallel to provide up to four output channels having any selected one of the four multiplexed output signals from serial adder 84 demultiplexed on each of the four output channels (in FIG. 4, output channels 1 and 2 correspond to output buses 801 and 901, respectively, as shown in FIG. 2). Modulation feedback line 93 couples the outputs of the serial adder 84 to multiplexer 851 via control logic 87 to provide modulation signals for internal channel A.

RAM 89 stores selectable values of phase offset, amplitude and frequency and is directly accessed by external control signals on bus 68 to program internal channel A to provide a predetermined sequence of output signals having independent phase, amplitude and frequency states. Up to sixteen frequency/amplitude/phase states can be entered into the RAM 89 from the keyboard and display unit 50. To shift or "hop" between states, an external device (not shown) addresses the four-bit TTL-level external control bus 68. As the address coupled to the bus 68 varies, the internal channel A signal will shift to the frequency/amplitude/phase state that corresponds to that address of the RAM 89. Phase continuous frequency shifting can be done very quickly since the signals are digitally synthesized and there is no settling time as in analog phase lock loop synthesizers. The other internal channels B, C and D may be used to modulate internal channel A while channel A is shifting. For example, internal channel B could be programmed to modulate internal channel A with uniform noise while channel A is shifting. This would provide an output signal on output channel 1 (line 861) having controlled amounts of phase noise added to the shifting signal.

The digital signal processor 70 comprises the simplified block diagram shown in FIG. 4. The digital signal processor 70 is a fully digital approach to the analog functions of modulation and signal generation implemented in a signal chip. The data path architecture of the digital processor 70 comprises 26 pipe stages in which 23 simultaneous operations take place. To achieve an increase in speed of the circuit extensive hard-coding was utilized. Extensive use of multiplexing circuits allowed a large reduction in circuit components and required chip space.

Figure 5:
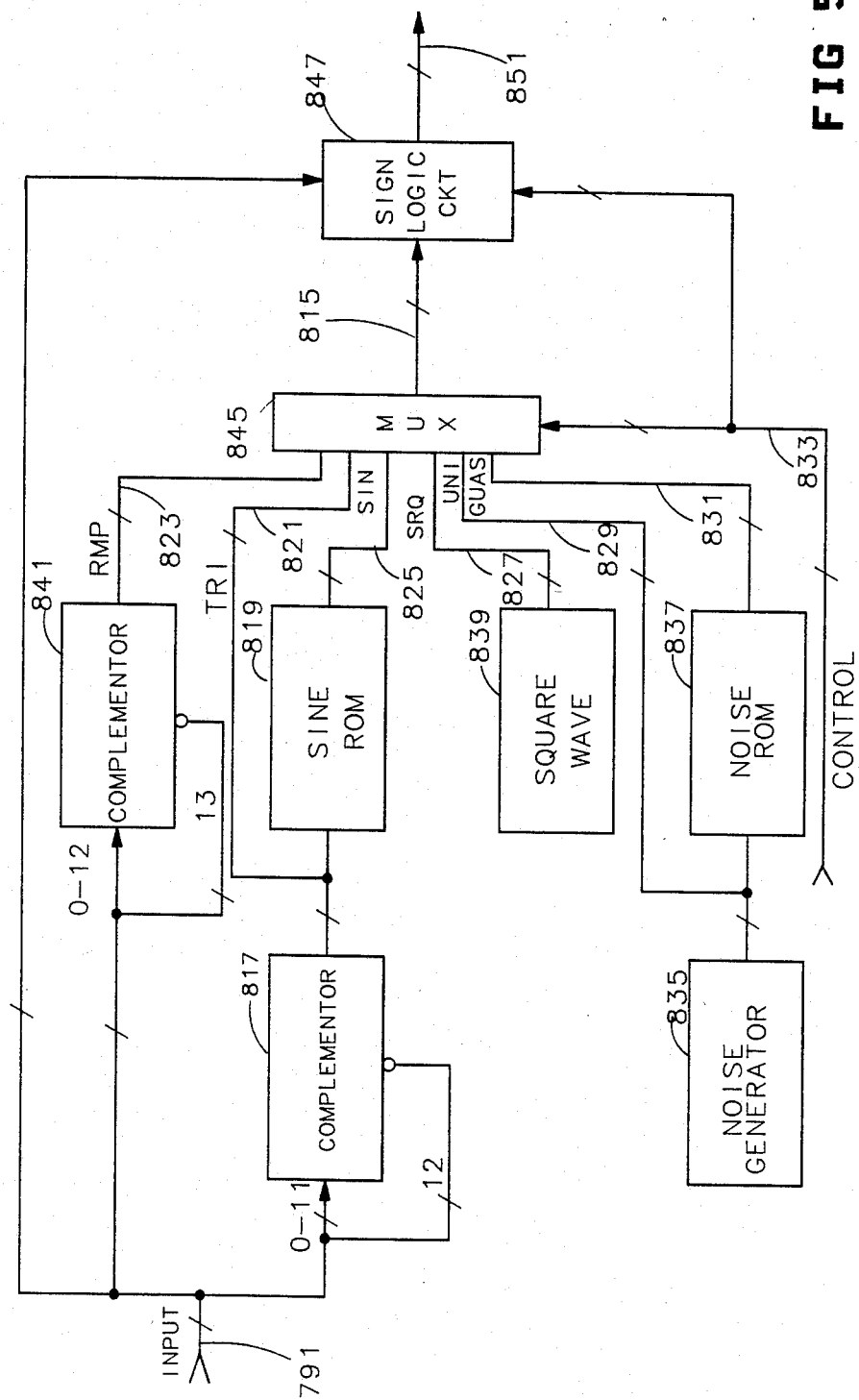
FIG. 5 is a detailed block diagram of the waveform generator utilized in the digital signal processor of FIG. 3.

Referring now to FIG. 5, a more detailed block diagram of the waveform generator 81 is shown. The waveform generating or shaping circuit digitally synthesizes four fundamental waveforms including ramp wave, square wave, triangle wave and sine wave plus uniform noise, Gaussian noise and a DC output. The ramp waveform on line 823 is derived directly from the binary number sequence on line 791 at the output of the phase adder 79. The complementor block 841 is a programmable invertor to invert the ramp up signal to provide a ramp down signal. The triangle waveform on line 821 is also derived directly from the input on line 791. ROM 819 stores digital values corresponding to the magnitude of digital samples representing the first quadrant of a sine wave. The binary numbers input on line 791 represent address signals corresponding to the storage location in ROM 819 where the digital value associated with the phase of the sign wave corresponding to the associated address signal is stored. Complementor circuit 817 is a programmable invertor that accesses ROM 819 as a function of the quadrant of the sine wave. ROM 819 provides output signals on line 825 which represent two quadrants of the sine wave. A square wave synthesizer 839 outputs a sequence of binary ones to provide a steady DC level. To achieve a square wave, the steady DC level is shifted by the sign generation logic 847 to provide a square wave having the predetermined frequency. The noise generator 835 is a 31 bit linear feedback shift register which provides 128 seconds of pseudorandom, uniformally distributed cyclic noise to provide a uniform noise signal output on line 829. A Gaussian distribution of noise amplitudes is derived by filtering the uniform noise from the noise generator 835 through a noise ROM 837 to provide a Gaussian noise signal on line 831. Multiplexer 845, in response to control signals on line 833, matches a predetermined waveform to the corresponding internal channel A, B, C or D and couples each internal channel signal on line 815 multiplexed in time to the sign generation logic 847. The multiplexed output of the sign generation logic 847 then is then coupled to the serial adder 84 via multiplier 83 (as shown in FIGS. 3 and 4).

Figure 6:
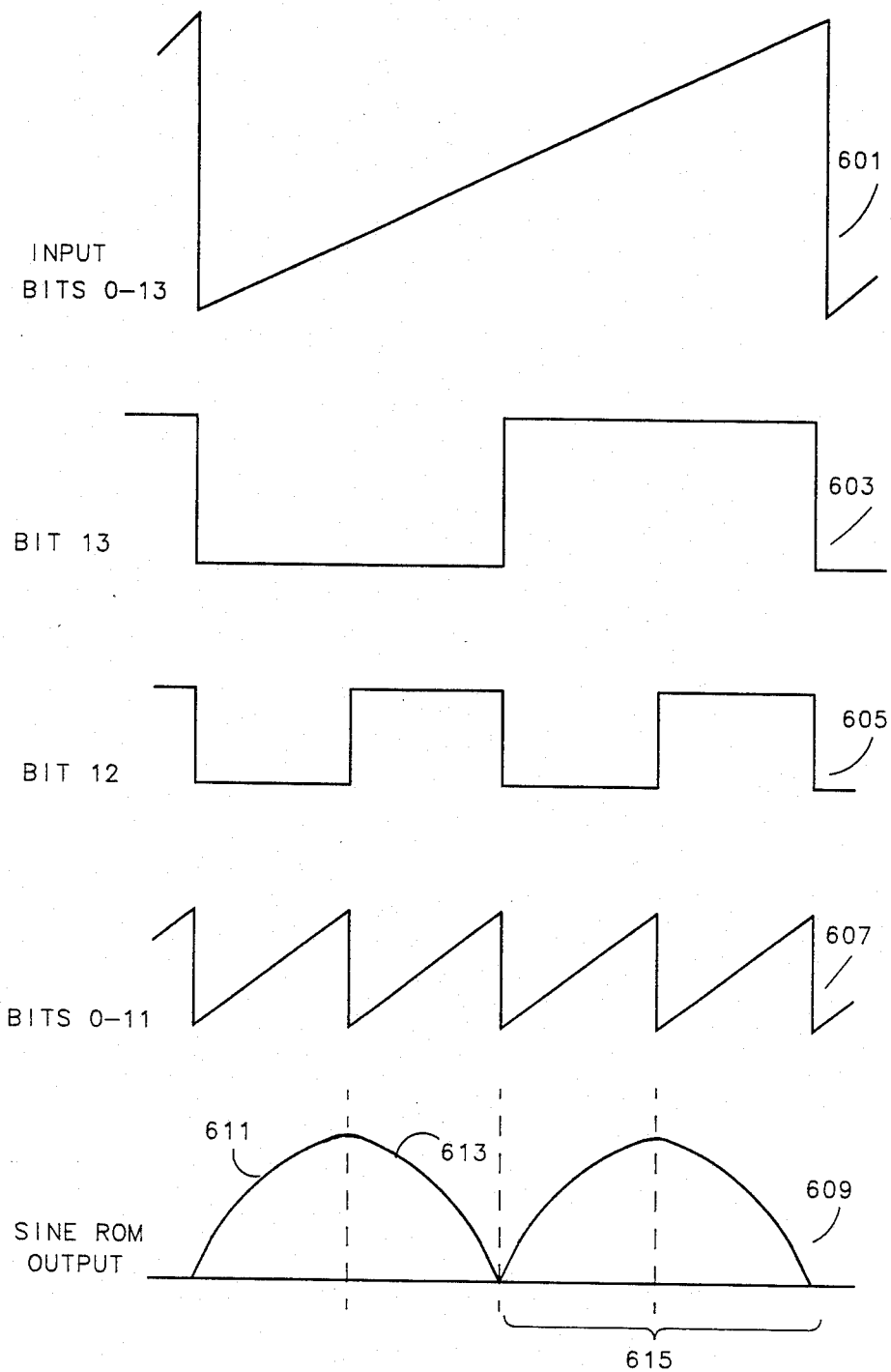
FIG. 6 is an analog representation of the digital signals utilized to digitally synthesize the sine wave output signal.
Figure 7:
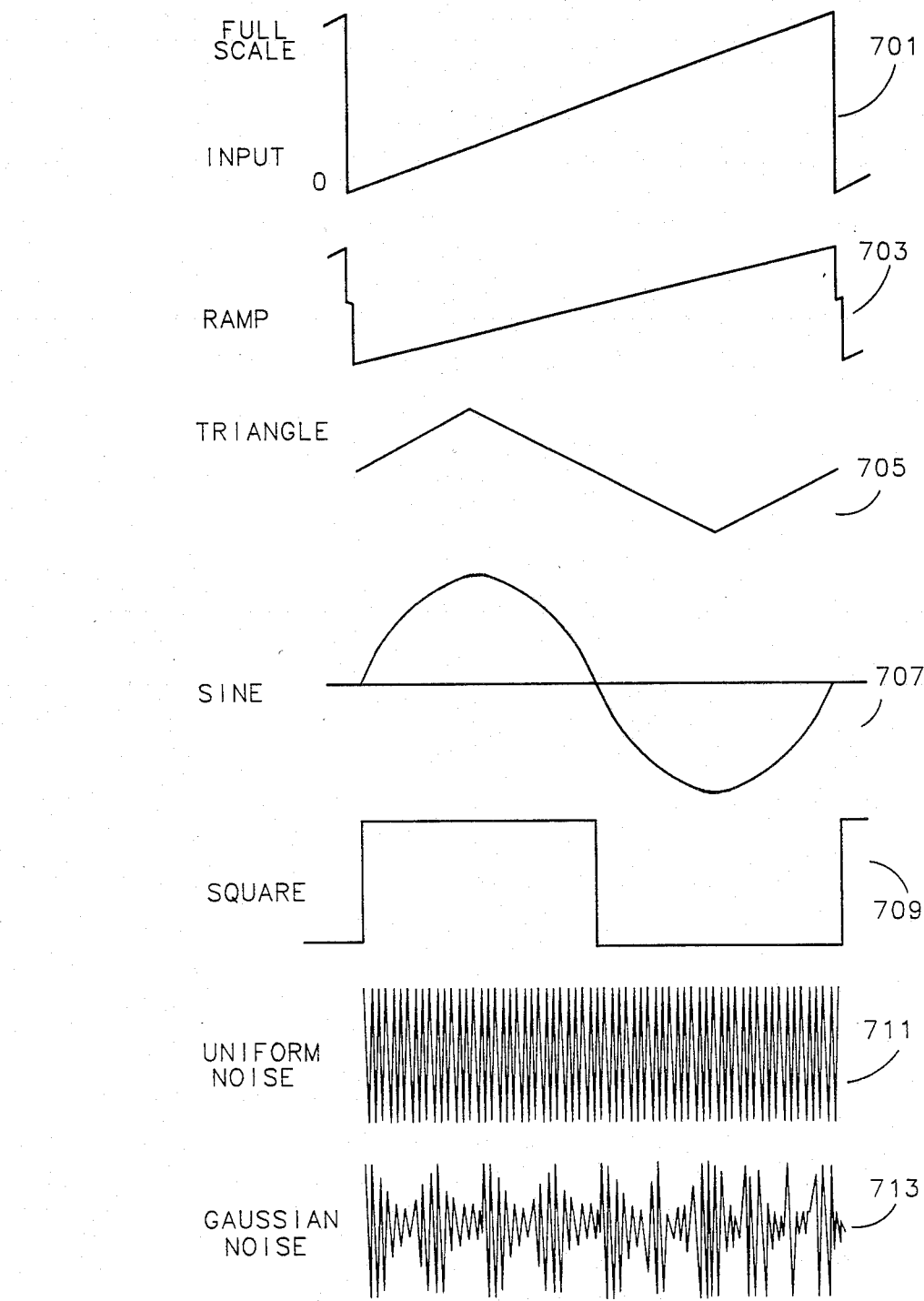
FIG. 7 is an analog representation of the digital waveforms digitally synthesized by the waveform generator of FIG. 5.

Referring now also to FIGS. 6 and 7, the input signal on line 791 is a 14-bit digital signal represented by analog ramp signal 601. Bits 0-12 represented by analog waveforms 605 and 607 are complemented by bit 13 (represented by analog waveform 603) in complementor 841 to synthesize the ramp waveform on line 823. Bits 0-11, waveform 607, are complemented by bit 12, waveform 605, in complementor 817 to synthesize a digital triangle waveform on line 821. Bits 0-11, waveform 611, address the sine ROM 819 which outputs the digital valves corresponding to the phase points represented by Bits 0-11 to synthesize the first quadrant 611 of the sine wave halves 609. Bit 12, waveform 607, complements Bits 1-11 to reverse the order in which sine ROM 819 is addressed to produce the second quadrant 613 of sine wave 609. When bit 12, 605, is low, the first quadrant 611 is output by sine ROM 819 and when bit 12, 605, is high, the second quadrant 613 is output by sine ROM 819.

Bit 13, waveform 603, is also coupled to the sign logic circuits 847 which performs the final step in the waveform synthesis. For example, when one or more of the four internal channels A, B, C and D are programmed to have a sine waveform, control signals on line 833 to multiplexer 845 cause the sine wave halves, waveform 609, to be multiplexed onto line 815 in the time window corresponding to whichever channel is to be a sine wave. The sine wave halves, waveform 609, is coupled to the sign logic circuit 847. When bit 13 is low, the sign logic circuit outputs on line 851 the positive half, quadrants 611 and 613, of the sine Wave. When bit 13 goes high, the sign logic Circuit reverses the polarity of sine wave half 615 to output a digital signal on line 851 which represents a complete sine wave as illustrated by waveform 707. In a similar manner, the sign logic circuit 847 reverses the polarity (level) of the digital signals input on line 815 to provide the selected waveform. Four basic waveforms, ramp 703, triangle 705, sine 707 and square 709 and uniform noise and Gaussian noise 713 plus a DC level (not shown) may be output on line 851.

We claim:

1. A digital frequency synthesizer comprising:
   frequency input means for setting a predetermined output frequency and for generating first digital signals representing said predetermined output frequency;
   frequency modulation input means for inputting a frequency modulation signal;
   waveform selection input means for generating a waveform selection signal for selecting a predetermined output waveform;
   first summing means coupled to said frequency input means and said frequency modulation input means for summing said first digital signals and said frequency modulation signal and generating second digital signals representing said predetermined output frequency modulated by said frequency modulation signal;
   phase accumulator means coupled to said first summing means for receiving said second digital signals and responsive to a first clock signal for generating a cyclic progression of digital binary numbers representative of an output signal having said predetermined output frequency;
   phase modulation input means for inputting a phase modulation signal;
   second summing means coupled to said phase modulation input means and to said phase accumulator means for summing said phase modulation signal with said digital binary numbers output by said phase accumulator means and outputting third digital signals representative of said digital binary numbers modulated by said phase modulation signal; and
   waveform generation means coupled to said waveform selection input means and to said second summing means for generating a plurality of selectable waveforms and responsive to said third digital signals and to a control signal for generating digital output signals representative of said selected waveform modulated by said frequency modulation signal and said phase modulation signal and having said predetermined output frequency.

2. A digital frequency synthesizer as in claim 1 further comprising:
   amplitude modulation input means for inputting an amplitude modulation signal; and
   amplitude modulation means coupled to said amplitude modulation input means and coupled to an output of said waveform generation means and responsive to said amplitude modulation signal for amplitude modulating said digital output signals output by said waveform generation means.

3. A digital frequency synthesizer as in claim 1 wherein said waveform generation means includes first storage means having a multiplicity of storage locations for storing at least one set of digital values, each set of digital values corresponding to at least the magnitude of a plurality of digital samples of a different predetermined output signal waveform.

4. A digital frequency synthesizer as in claim 3 wherein said waveform generation means further comprises noise generator means for generating a uniform noise waveform signal.

5. A digital frequency synthesizer as in claim 4 wherein said noise generator means includes means for generating a Gaussian noise waveform signal.

6. A digital frequency synthesizer as in claim 2 further comprising:
   digital-to-analog converter means coupled to said amplitude modulation means for converting said digital output signals to an analog output signal have said selected waveform modulated by said frequency modulation signal, said phase modulation signal and said amplitude modulation signal and having said predetermined output frequency; and analog filter means coupled to said digital-to-analog converter means for filtering said analog output signal.

7. A digital frequency synthesizer as in claim 2 wherein said amplitude modulation means includes means responsive to a pulse modulation signal for pulse modulating said digital output signals.

8. A digital frequency synthesizer as in claim 2 wherein said first summing means, phase accumulator means, second summing means, waveform generation means and amplitude modulation means comprise a single monolithic integrated circuit on a single chip.

9. A multifunction digital frequency synthesizer system comprising:
- a plurality of independent digital frequency synthesizer means, each of said independent digital frequency synthesizers generating an independent digital output signal having a predetermined, selectable frequency, phase offset, amplitude and waveform;
- first multiplexer means having an output bus and a plurality of inputs, each of said inputs coupled to a different one of said plurality of digital frequency synthesizers, said first multiplexer means for time-multiplexing said plurality of digital output signals on said multiplexer output bus;
- adder means coupled to said multiplexer output bus for summing at least one of said plurality of time-multiplexed digital output signals in any predetermined combination and outputting a plurality of time-multiplexed summed digital output signals on an adder output bus, each of said summed digital output signals being the sum of at least one of said plurality of digital output signals in any predetermined combination;
- feedback means coupled to said adder output bus providing feedback to a first digital frequency synthesizer of said plurality of digital frequency synthesizers, said first digital frequency synthesizer generating a first digital output signal modulated by any predetermined combination of said time-multiplexed summed digital output signals; and
- demultiplexer means coupled to said adder output bus and having at least one output bus for demultiplexing said plurality of summed digital output signals and outputting a selected summed one of said plurality of digital output signals on each demultiplexer output bus.

10. A multifunction digital frequency synthesizer system as in claim 9 wherein each of said independent digital frequency synthesizer means comprise:
- frequency input means for setting a predetermined output frequency and for generating first digital signals representing said predetermined output frequency;
- frequency modulation input means for inputting a frequency modulation signal;
- waveform selection input means for generating a waveform selection signal for selecting a predetermined output waveform;
- amplitude modulation input means for inputting an amplitude modulation signal;
- first summing means coupled to said frequency input means and said frequency modulation input means for summing said first digital signals and said frequency modulation signal and generating second digital signals representing said predetermined output frequency modulated by said frequency modulation signal;
- phase accumulator means coupled to said first summing means for receiving said second digital signals and responsive to a first clock signal for generating a cyclic progression of digital binary numbers representative of an output signal having said predetermined output frequency;
- phase modulation input means for inputting a phase modulation signal;
- second summing means coupled to said phase modulation input means and to said phase accumulator means for summing said phase modulation signal with said digital binary numbers output by said phase accumulator means and outputting third digital signals representative of said digital binary numbers modulated by said phase modulation signal;
- waveform generation means coupled to said waveform selection input means and to said second summing means for generating a plurality of selectable waveforms and responsive to said third digital signals and to a control signal for generating a digital output signal representative of said selected waveform modulated by said frequency modulation signal and said phase modulation signal and having said predetermined output frequency; and
- amplitude modulation means coupled to said amplitude modulation input means and to said waveform generation means responsive to said amplitude modulation signal for amplitude modulating said digital output signal.

11. A multifunction digital frequency synthesizer system as in claim 9 wherein said plurality of independent digital frequency synthesizer means comprise:
- first input multiplexer means for inputting a selected one of a plurality of frequency selection signals, each of said frequency selection signals representative of a predetermined output frequency;
- second input multiplexer means for inputting a selected one of a plurality of phase offset signals;
- third input multiplexer means for inputting a selected one of a plurality of amplitude level set signals;
- fourth input multiplexer means for inputting a selected one of a plurality of waveform selection signals;
- digital frequency synthesizer means coupled to said first, second, third and fourth input multiplexer means and to said feedback means and having an output bus and responsive to a plurality of control signals for generating a plurality of independent digital output signals time-multiplexed on said synthesizer output bus, each of said plurality of independent digital output signals having predetermined frequency, phase offset and amplitude, a first digital output signal of said plurality of independent digital output signals being modulated by any predetermined combination of said time-multiplexed summed digital output signals; and
- control means coupled to said input multiplexers, said digital frequency synthesizer means, said first multiplexer means, said adder means, said feedback means and said demultiplexer means for providing said control signals.

12. A multifunction digital frequency synthesizer system as in claim 11 wherein said control means includes:

an external control input bus;

storage means for storing a plurality of digital signals representing predetermined values of frequency, phase and amplitude; and said control means responsive to an external control signal input on said external control input bus for programming said digital frequency synthesizer means to generate said first digital output signal comprising a predetermined sequence of digital output signals having independent phase, amplitude and frequency states.

13. A multifunction digital frequency synthesizer system in claim 12 wherein said control means further includes an external reference input means for providing reference signals to phase lock said selected summed digital output signal on each demultiplexer output bus to an external reference signal.

* * * * *